UNITED STATES PATENT OFFICE.

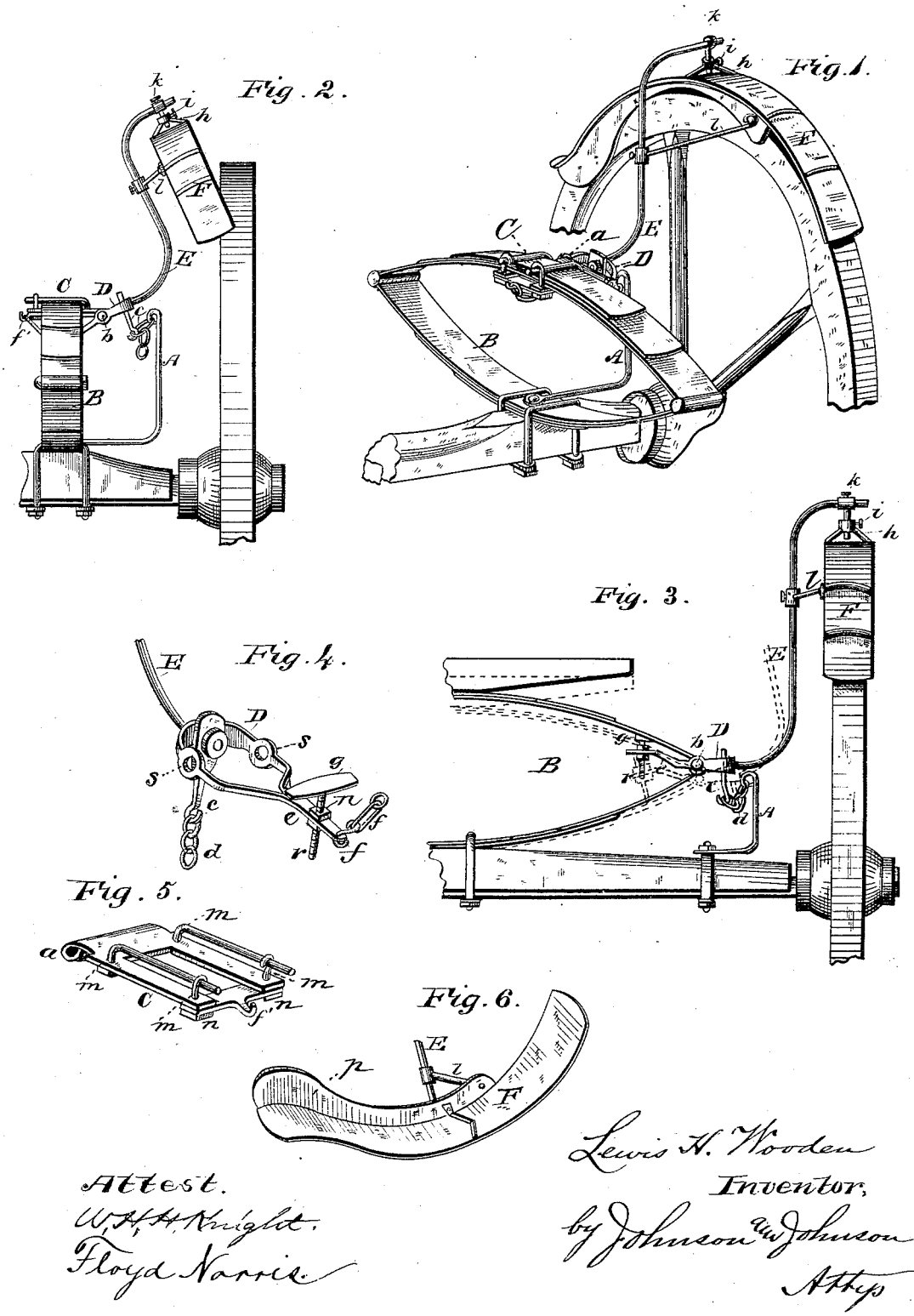

LEWIS H. WOODEN, OF HAMPSTEAD, MARYLAND.

IMPROVEMENT IN FENDERS FOR CARRIAGES.

Specification forming part of Letters Patent No. 223,206, dated December 30, 1879; application filed November 12, 1879.

*To all whom it may concern:*

Be it known that I, LEWIS H. WOODEN, of Hampstead, in the county of Carroll and State of Maryland, have invented certain new and useful Improvements in Fenders for Carriages; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

I have invented means for attaching and controlling the fender by the action of the vehicle-springs, so that as the spring is depressed in crossing ruts it thereby elevates and carries the fender over out of contact with the wheel, and restores said fender to its normal position when the obstruction is passed and the spring resumes its natural position. In connection with this I find that it is not only desirable to make the fender removable, but to render it capable of adaptation to vehicles which have their springs either at right angles to or in line with the axle. All these results I accomplish by substantially the same mechanical devices, all of which shall be hereinafter particularly described, and specified in the claims.

In the accompanying drawings, Figure 1 represents a perspective view, showing my improved fender as applied to a vehicle in which the spring is at right angles to the axle; Fig. 2, an end view of the fender devices, showing the manner of elevating and tilting the fender out of contact with the wheel; Fig. 3, a similar view, showing the application of my improvements to vehicles which have their springs parallel with the axles; Fig. 4, a detail of the yoke which is the means of connecting the fender-supporting rod with the spring; Fig. 5, a detail of the saddle-clip which connects the yoke with the spring, and Fig. 6 a detail of the fender proper in reverse position to show its side guard.

In carrying out my invention as applicable to those vehicles which have their springs crossing the axle, I fasten an outwardly and upwardly projecting hook, A, to the bottom part of the elliptical spring B, or to the axle itself, while to the top part of said elliptical spring I fasten a saddle-clip, C, of any suitable construction, so that it carries a sleeve, a, for the reception of a bolt, b, which is the means of pivoting a yoke, D, to which yoke there is rigidly fastened the supporting-arm E of the fender F; and at the connection of said arm and yoke there is a depending hook, c, carrying a chain, d, which makes the connection of the axle-hook A with the yoke in such manner as to permit of the play of the supporting-arm E in its act of elevating the fender when the spring of the vehicle is depressed. To the opposite side of the yoke, or on that side nearest the vehicle-body, is an arm-extension, e, of the yoke, to which a rubber spring, f, Fig. 4, is fastened, and connected to the above-described clip by a hook, f', Fig. 5. This rubber spring acts as a flexible stop to prevent the fender from being thrown too far over against the vehicle as the spring B is depressed, while said fender is prevented from falling over against the wheel by means of a crutch, g, of said arm-extension e of the yoke, which crutch has its bearing against the top part of the vehicle-spring from the under side, as shown. The supporting-arm E of the fender is connected therewith by a stud cross-connection, h, rising from the top of the fender, and so arranged that when the fender is elevated a sufficient distance above the wheel its position may be assured by a set-screw, i, and also so that when the fender is brought concentric with the wheel it may be so kept by a clamp-screw, k, as shown. A brace-rod, l, connects the fender with its support in proper position.

The saddle-clip C is constructed as shown, with its fastenings m made adjustable, so that it may be clipped over different thicknesses of springs. The crutch g is also adjustable vertically by screw-burrs n n, so that it may be arranged with reference to springs of different thicknesses.

The fender F has a side piece, p, to prevent mud bespattering the side of the vehicle. These fenders and their operating mechanism are applied to each side of vehicles.

The yoke D has eyes s s, through which the bolt b is passed for the pivoting of said yoke.

In order to apply my invention to a vehicle in which the springs are parallel with the axle it is only necessary to take the fender, with its supporting-rod E and yoke D, from the clip C, and arrange it as shown in Fig. 3, where it will be seen that the hook A is fastened directly to the bed-piece of the axle upon the usual clip, and that the yoke D has its pivot-bearing upon the end bolt, b, of the spring, and that the crutch g bears against the upper part of the vehicle-spring. This spring is depressed by the load in passing over ruts, and the fender is elevated, as before described. The fender is prevented from being thrown too far by the leg r of the adjustable crutch g, while the rubber spring is omitted. The connecting-chain d and all other parts perform their functions the same in this event as in the one first described.

It is obvious that my invention is not confined to the mere devices described and shown, but that it embraces any means for connecting the fender proper with the spring whereby said fender may be thrown out of contact with the wheel as the vehicle crosses ruts or obstructions, as fully set forth above.

I claim—

1. The combination of a fender proper with the spring of a vehicle and intermediate connecting means, whereby said fender may be elevated out of contact with the wheel by the depression of the spring in crossing ruts and afterward resume its normal position, substantially as described.

2. The combination of a fender proper, F, a supporting-rod, E, therefor, terminating in a yoke, D, pivoted to the vehicle-spring, the supporting-crutch g, upon which said spring acts, and the hook A, connected to the axle and to the yoke at a point between its connection and the fender, whereby, when the spring is depressed, the fender F will be elevated out of the way of the wheel, substantially as described.

3. In a fender for vehicles adapted to be thrown out of the way of the wheel in passing ruts by a supporting-rod pivoted to the spring, the yoke D of said rod E, provided with crutch g, hook c, and eyes s, in combination with a sleeved clip, C, or its equivalent, attached to said spring, substantially as described.

4. In a fender for vehicles supported by a rod from the spring, whereby to elevate it out of the way of the wheel in crossing ruts, the fender proper, made adjustable over said wheel as to height and position, by means substantially as described.

In testimony that I claim the foregoing I have hereto affixed my signature in the presence of two witnesses.

LEWIS H. WOODEN.

Witnesses:
A. E. H. JOHNSON,
J. W. HAMILTON JOHNSON.